United States Patent [19]

Dinsdale et al.

[11] 4,277,070
[45] Jul. 7, 1981

[54] PHONOGRAPH

[75] Inventors: Jack Dinsdale, Carlton; David W. Parkins, Bedford; John P. Hardwick, Bolton, all of England

[73] Assignee: Cranfield Institute of Technology, Cranfield, England

[21] Appl. No.: 108,300

[22] Filed: Dec. 28, 1979

[30] Foreign Application Priority Data

Jan. 9, 1979 [GB] United Kingdom ................... 675/79

[51] Int. Cl.$^3$ ............................................... G11B 3/18
[52] U.S. Cl. .................................... 369/248; 369/254
[58] Field of Search ................. 274/23 R, 23 A, 23 B, 274/24

[56] References Cited

U.S. PATENT DOCUMENTS

| 2,257,028 | 9/1941 | Westerkamp | 274/23 R |
| 2,357,034 | 8/1944 | Thompson et al. | 274/23 R |
| 2,819,087 | 1/1958 | Cerone | 274/23 R |
| 3,226,124 | 12/1965 | Peterson | 274/23 R |

FOREIGN PATENT DOCUMENTS 1561707 2/1977 United Kingdom .

Primary Examiner—Harry N. Haroian
Attorney, Agent, or Firm—Murray and Whisenhunt

[57] ABSTRACT

A phonograph has a viscous damping arrangement coupling a pick-up arm to the base of the phonograph to damp vertical and horizontal vibrations of the arm. The damping means is coupled to the arm at a position close to the pick-up cartridge of the arm. A counter-balance mass is also provided on the arm, the mass having an adjustable position and mass.

14 Claims, 3 Drawing Figures

PHONOGRAPH

FIELD OF THE INVENTION

The present invention relates to phonographs.

BACKGROUND OF THE INVENTION

A pick-up arm for a phonograph generally carries a cartridge having a stylus one end of which is connected to the main body of the cartridge by means of compliant coupling, the other end resting between the two walls of a record groove during use. Information in the groove is converted into electrical signals in dependence upon the relative vertical and horizontal velocities between the stylus tip and the main body of the cartridge. The arm should therefore carry the cartridge in such a way that the cartridge converts into electrical signals all of the recorded audio information, and no other extraneous information such as record warps, eccentricity and turntable rumble. In order to achieve these conditions, the arm should be completely motionless (that is apart from the movement necessary to track the spiral record groove) when the cartridge is detecting audio information (i.e. frequencies in the range from 20 Hz to 20 kHz, this range being generally known as the audio bandwidth). If the arm moves when it should not there is a loss of definition causing such effects as, for example, brash sounding guitar, muddling of base, or screeching of violin tones. Such unwanted movements in the audio bandwidth can be caused by reflections of some of the mechanical energy which is not converted into electrical signals.

However, it is necessary for the pick up arm to possess such freedom of movement that the stylus is able to follow gross errors of movement of the point of contact between the stylus and the groove on the surface of the record—such as those due to warps and eccentricity in the record, and mechanical inaccuracies in the turntable used to support the record. The error can be of up to 5 mm magnitude; the modulation of the groove itself typically ranges from 0.1 μm to 0.5 mm.

Eccentricity errors in records cause unwanted movements within the horizontal plane having frequencies of 0.56 Hz and 0.75 Hz respectively for standard speeds of rotation of micro-groove records, i.e. 33⅓ and 45 rpm.

The frequency of the unwanted movements within the vertical plane, which are due principally to warped records, depends on the number of warps. It can be calculated that the fundamental frequency of such movements ranges between 0.56 and 3 Hz, the maximum occurring in the unusual case of a record with four warps, played at 45 rpm. The maximum fundamental error frequency in either horizontal or vertical planes is therefore well below 20 Hz, that is well below the lowest frequency of the audio bandwidth, although harmonics can exceed 20 Hz in frequency. There will be a frequency dependent on the combination of the stiffness of the stylus mounting and the mass of the arm and cartridge and in the absence of damping at which a fundamental resonance condition can occur if an input from a record, either from warps or groove modulation, occurs at, or close, to this frequency. In the absence of damping the assembly can vibrate with an amplitude many times greater than the amplitude of the original input and large distorting signals are produced by the cartridge. Such distorting signals can vary from about 5 Hz to 20 Hz. It is of course desirable that such resonances do not occur in the audio bandwidth but even those at subaudible frequencies tend to modify the higher frequency audible signals, by cross-modulation, and can produce a cartridge amplifier overload condition which can damage both the amplifier and other equipment such as loud speakers, and also lead to excessive record wear. Hence a mechanical filter or damping means is needed to ensure that the pick up arm will allow gross movements of the pick up, and hence of the cartridge body, at frequencies below the audio bandwidth, but will minimise all unwanted movement of the cartridge at frequencies within the audio bandwidth and will damp any resonance of the arm and cartridge.

Damping has been used in SME equipment, in which there is a paddle, rigidly attached to the arm near its pivot, sitting in a stationary bath of high viscosity fluid fixed to the support on which the pivot rests. The bath is arcuate having a radius sufficient to provide equal damping at all playing positions. The Hadcock GH 228 super arm, Keith Marks M9BA mark 3 and Mayware formula 4 arms also use viscous damping in a manner very similar to this. In these known cases the damping means is applied either at the bearing itself or in close proximity thereto and although they allow free movement of the cartridge over warps, at higher frequencies but within the audio bandwidth, more complex vibration modes of other arm components (sometimes caused by acoustical feedback) e.g. flexural or torsional vibrations of the arm tube, become evident. The damper, as well as the pivot, acts as a rigid fixed point at high frequencies, and the dynamic model of the arm changes from a pivoted damped beam at low frequencies, to an undamped cantilever beam at high frequencies. Hence the SME damper and similar models are only truly effective in low frequency applications.

SUMMARY OF THE INVENTION

The phonograph of the present invention comprises:
a support;
a bearing arrangement fixedly coupled to the support;
a pick-up arm mounted on the bearing arrangement and having carrying means for attaching a pick-up cartridge to the arm;
first damping means secured relative to the carrying means at a position on the arm nearer the carrying means than the bearing arrangement; and second damping means having means for securing the second damping means to the support, and co-operable with the first damping means to provide damping between the carrying means and the support, for damping a range of frequencies of vertical and horizontal vibrations of the carrying means, so as to provide relatively low damping for frequencies below 5 Hz, moderate damping between 5 Hz and 20 Hz, and relatively high damping for frequencies above 20 Hz.

It is therefore an object of the present invention to provide a phonograph having damping means which is effective over a wider range of frequencies than hitherto known.

It is a further object of the invention to provide a phonograph having a vicous damper which has direct effect at the position of the pick-up cartridge.

It is yet a further object of the invention to provide a phonograph having damping means which can substantially avoid unwanted high frequency complex modes of vibration caused by the arm vibrating, and damp out other unwanted audio frequency vibrations of the cartridge and of the arm, whilst allowing free movement over warps and eccentricities.

Preferably the phonograph has an arm mounted on a bearing arrangement fixedly coupled to the support; a pick up cartridge carried by the arm; and a counter-balance mass, a selectable portion of which is carried by the arm at a selectable position so that the effective mass and position of the counter-balance mass can be adjusted to adjust (a) the frequency of resonance, in use, between the arm and the stylus in dependence upon the total arm inertia and the compliance between the cartridge and stylus to ensure that this resonance frequency occurs too high to be initiated by warps or eccentricity errors, and preferably also too low to fall within the audio bandwidth, and (b) the down force of the pick-up.

Preferably, also, the resonance frequency is limited to between 8 and 15 Hz. The counter-balance mass may comprise a plurality of individually removable, interfitting, annular rings.

These and other objects of the present invention will become apparent from the following detailed description taken in conjunction with the Figures of the accompanying drawings.

DESCRIPTION OF THE PREFERRED EMBODIMENT

Figure 1:
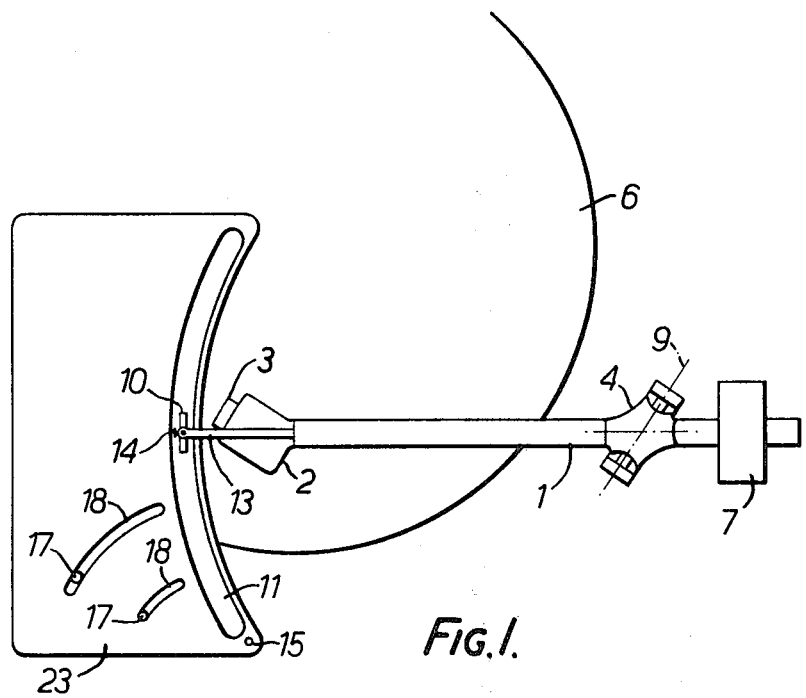
FIG. 1 is a plan view of a phonograph according to the invention, in an operative condition.
Figure 2:
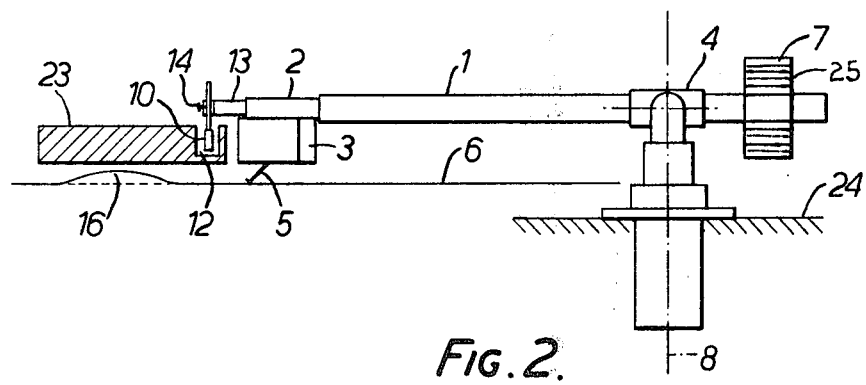
FIG. 2 is a cross-sectional view of the phonograph of FIG. 1.

FIGS. 1 and 2 show a phonograph comprising a support or base 24 (shown diagrammatically) fixedly supporting a bearing arrangement 4 carrying a pick-up or tone arm 1. At the extremity the arm 1 is mounted a head shell 2 which comprises fixing means to hold a pick-up cartridge 3 having a stylus 5 for making contact with a record 6. One or more counter-weights 7 are provided on the arm at the opposite side of the bearing arrangement 4 to the pick-up cartridge 3. The bearing arrangement 4 has a vertical axis of pivot 8 enabling the pick-up stylus to track the spiral record groove from the outside to the inside of a record 6, and a horizontal axis of pivot 9 enabling the stylus to contact the record and track gross vertical error movements, for example those caused by a warped record. The counter-weight 7 is adjustable for setting the down force of the stylus to the correct operating value. This is done either by varying the weight or the distance of the weight from the bearing. Suitable connecting means (not shown) transmit voltages generated within the pick-up cartridge 3 along the arm to processing apparatus (not shown).

Figure 3:
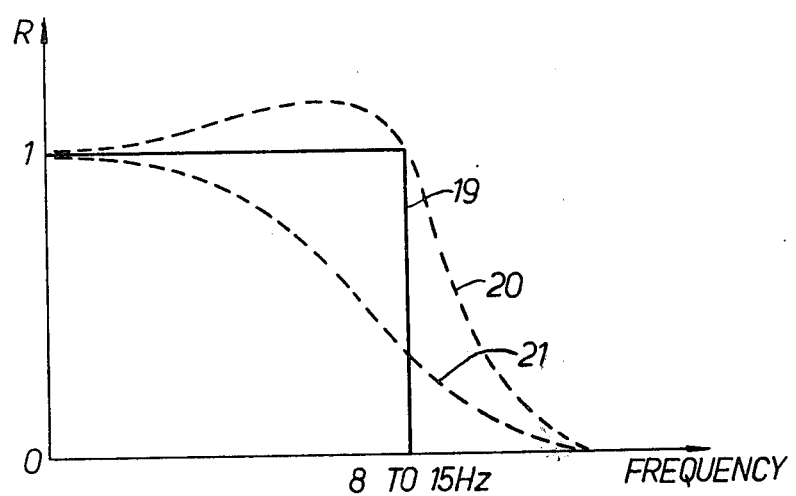
FIG. 3 is a graph showing the ideal and range of acceptable practical responses of a phonograph arm.

FIGS. 1 and 2 also illustrate a paddle 10 attached to the head shell 2 of the arm. This paddle co-operates with a fluid of suitable viscosity 12 in an arcuate trough 11, thereby to provide damping close to the cartridge itself. The paddle 10 is mounted on a beam 13 extending from the arm 1 beyond the cartridge 3. It is fixed to this beam by means of adjustment screw 14, allowing the height of the paddle in the fluid 12 to be adjusted, and also allowing the paddle to be removed. In this way the degree of damping can be selected for a particular cartridge, by selecting a particular paddle size and by adjusting its height in the fluid 12, so as to give the required response curve (FIG. 3). The trough 11 extends over the surface of a record with sufficient clearance to allow distortions of records such as a warp 16, to pass under it. The trough is formed in a member 23 pivotally mounted to support 24 about pivot point 15, so that it can be swung clear for changing records. Member 23 can be rigidly held to support 24 during playing of a record. Projections 17 on the phonograph support co-operate with slots 18 in the member 23 to provide support for the trough relative to support 24 whilst allowing it to be moved when required. It will of course be appreciated that the same result would be obtained if the projections were on the member 23, and the slots were on the phonograph support 24.

Whilst the embodiment illustrated shows a paddle co-operating with a fluid mounted directly in front of the cartridge, it will be appreciated that the phonograph could be constructed so that the damping is above the head shell, or behind the cartridge i.e. between the cartridge and the bearing arrangement but as near to the cartridge as possible. The illustrated embodiment however shows the most practically feasible position for damping.

As already mentioned counter-weight 7 is adjustable in respect of its mass as well as its position. This is achieved by virtue of it being formed of a plurality of inter-fitting, individually removable, annular rings (FIG. 2). Alternative forms for the counter-weight may be used, such as a variety of different removable masses.

For a particular pick-up cartridge, both the mass and the position, with respect to the bearing, of the counter-weight can, for most cartridges, be chosen so as to ensure that the static down force of the stylus on the record is at the correct operating value whilst also ensuring that the frequency of resonance between the inertia of the whole arm system and the compliance of the pick-up cartridge lies well below the audio pass band, and lies preferably in the range 8 to 15 Hz, i.e. in the range of frequencies which is unlikely to be excited by warps or eccentricities (which usually lie below 8 Hz), or by audio information (which lies above 20 Hz).

FIG. 3 is a graph showing the response to a cartridge arm system for a range of input frequencies. The ideal response is indicated by line 19 and lines 20 and 21 indicate the range of acceptable responses of a system according to the present invention.

The response R is taken to be $x_2/x_1$, i.e. output/input, where $x_2$ is the instantaneous displacement of the cartridge in response to an instantaneous displacement ($x_1$) of the stylus. In an ideal system, for an input well below the audio bandwidth i.e. well below 20 Hz, there should be no output signal. The cartridge should be free to move so that there is no relative displacement between it and the stylus, $x_2 - x_1$, and the response R is unity. However for an input in the audio bandwidth, i.e. above 20 Hz, the output signal should be a direct reflection of the input signal. Thus a displacement of the stylus corresponding to a value $x_1$ should cause a relative displacement between the stylus and the cartridge of $x_1$, therefore $x_2$ should be zero in the ideal system, i.e. the cartridge should remain stationary above 20 Hz, as shown by line 19 in FIG. 3.

The described phonograph can achieve a response curve similar to the ideal by virtue of the damping being in close proximity to the cartridge. This is shown by lines 20 and 21 which show the range of responses to a system with damping in close proximity to the cartridge.

The response R should take the form $0.95 \leq R \leq 1.0$ at frequencies $\leq 5$ Hz $R \leq 0.01$ at frequencies $\geq 20$ Hz $R < 1.5$ at all frequencies.

In setting up a system in accordance with the preferred embodiment of the present invention, the following steps may be taken.

Firstly, the mass of the counter-weight will be adjusted so as to limit the resonance frequency to a band in which it will not be exited by warps or eccentricities, and preferably below the audio band, i.e. say between 8 and 15 Hz. The resonance frequency is given by the equation:

$$F = \frac{1}{2\pi} \times \sqrt{\frac{K}{M}} \text{ Hz}$$

where K is the stiffness of the cartridge, i.e. the inverse of the compliance, and M is the total mass of the arm, the cartridge, and the counter-weight. The stiffness and mass of the cartridge can be found from manufacturers' specifications. Some examples are shown below in Table 1 which also indicates the maximum and minimum values of M required for each cartridge to limit the resonance frequency to the band 8 to 18 Hz.

TABLE 1

Mass and Stiffness Characteristics of Some Top Quality Cartridges.

| CARTRIDGE MAKE AND TYPE | MASS $M_c$ (gm) | COMPLIANCE (C.U.) | STIFFNESS $k_1$ (N/m) | VALUES OF M $15 > F > 8$ Hz Min (gm) | REQUIRED FOR Max |
|---|---|---|---|---|---|
| Decca London | 4.0 | 5 | 200 | 22.5 | 78 |
| Fidelity Research FR Mk2 | 13.0 | 10 | 100 | 11.3 | 39 |
| Goldring G900SE | 5.0 | 20 | 50 | 5.6 | 30 |
| Nakamichi MC1000 | 8.2 | 16 | 63 | 7.0 | 26 |
| National Panasonic EPC270C2 | 6.0 | 10 | 100 | 11.3 | 29 |
| Ortofon MC 20 | 7.0 | 15 | 67 | 7.5 | 20 |
| Shure M95ED | 6.0 | 30 | 33 | 3.8 | 10 |
| Sonus Red | 5.5 | 50 | 20 | 2.3 | 8 |
| Ultimo 20A | 9.5 | 8 | 125 | 14.0 | 50 |

It can be seen from this table that for some cartridges, particularly the high compliance, low mass ones such as the Sonus Red and the Shure M95ED the maximum value of M required will be easily exceeded taking into account the mass of the cartridge itself.

For these cartridges the damping means of the invention is particularly useful.

Secondly, a suitable paddle and fluid of suitable viscosity must be selected for the pick-up cartridge being used. It is anticipated that particular paddles will be made specifically for use with particular cartridges, so as to reduce time in setting up a phonograph using such damping means. Fine adjustments can be made by the user by means of adjustment screw 14, to ensure that the paddle is immersed in the fluid 12 to an appropriate level.

Finally, the static downforce of the stylus on a record is set to that required for the stylus to satisfactorily track the record groove by adjusting the position of the balancing mass, and also possibly its mass within the limits calculated above, in order to restrict the resonance frequency. The adjustment of the correct stylus static downforce is carried out with the paddle (or paddles) immersed in the fluid in the trough to the normal working depth (i.e. with the stylus at normal playing height) so as to compensate for the effects of upthrust and surface tension on the paddle. Furthermore, the design must be such that the values of upthrust and surface tension remain effectively constant regardless of any gross vertical motion caused by warped records.

We claim:

1. A phonograph record disc player comprising:
a support;
a bearing arrangement fixedly coupled to the support;
a pick-up arm mounted on the bearing arrangement or horizontal and vertical movement on the record disc and having carrying means for attaching a pick-up cartridge to the arm;
first damping means secured to the carry means at a position nearer the carrying means than the bearing arrangement; and
second damping means overlying said disc having means for securing the second damping means to the support, said first and second damping means cooperating to provide damping between the carrying means and the support, for damping a range of frequencies of vertical and horizontal vibrations of the carrying means, whilst allowing free movement over warps and eccentricities of the record disc, thereby to provide relatively low damping for frequencies below 5 Hz, moderate damping between 5 Hz and 20 Hz, and relatively high damping for frequencies above 20 Hz.

2. A phonograph according to claim 1, wherein said damping means is arranged to provide a change-over from relatively low to relatively high damping in the range of frequencies from 8 to 18 Hz.

3. A phonograph according to claim 2, wherein the first damping means comprises a paddle and the second damping means comprises a trough, which is rigidly fixable to the support, for containing viscous fluid in which the paddle can move.

4. A phonograph according to claim 3, wherein said paddle is removable.

5. A phonograph according to claim 4, wherein said trough is arranged to extend with clearance above the surface of said record disc when the phonograph is in use.

6. A phonograph according to claim 5, wherein said trough is of arcuate form.

7. A phonograph according to claim 5, wherein said trough is of linear form.

8. A phonograph according to claim 5, wherein said trough is removable.

9. A phonograph according to claim 1, and comprising a counter-balance mass, a selectable portion of which is carried by the arm at a selectable position so that the effective mass and position of the counter-balance mass can be adjusted to adjust (a) the frequency of resonance, in use, between the arm and the stylus in dependence upon the total arm inertia and the compliance between the cartridge and stylus to ensure that this resonance frequency occurs too high to be initiated by warps or eccentricity errors, and preferably also too low to fall within the audio bandwidth (b) the down force of the pick-up.

10. A phonograph according to claim 9, wherein the mass of the counter-balance mass is selectable to select the resonance frequency to be less than 20 Hz.

11. A phonograph according to claim 10, wherein the mass of the counter-balance mass is selectable to select the resonance frequency to be less than 15 Hz.

12. A phonograph according to claim 11, wherein the mass of the counter-balance mass is selectable to select the resonance frequency to be between 8 and 15 Hz.

13. A phonograph according to claim 9, wherein said counter-balance mass comprises a plurality of individually removable interfitting annular rings.

14. In a phonograph record disc player including a support, a bearing arrangement fixedly mounted on said support, a pick-up arm mounted on said bearing arrangement for horizontal and vertical movement over said record disc and having a carrying means for attaching a record player pick-up cartridge to said arm, and a damping arrangement for providing damping between said carrying means and said support, the improvement comprising said damping arrangement including first damping means secured to said carrying means at a position nearer said carrying means than said bearing arrangement, and second damping means having means for securing said second damping means to said support, said first damping means comprising a paddle and said second damping means comprising a trough rigidly fixable to said support for containing viscous fluid in which said paddle move, said through overlying said record disc said first and second damping means cooperating to provide damping between said carrying means and said support for damping a range of frequencies of vertical and horizontal vibrations of the carrying means, whilst allowing free movement over warps and eccentricities of the record disc, thereby to provide relatively low damping for frequencies below 5 Hz, moderate damping between 5 Hz and 20 Hz, and relatively high damping for frequencies above 20 Hz.

* * * * *